May 17, 1966  J. B. KRAELING  3,251,590
FOLDED SPRINGS

Filed Dec. 26, 1963  7 Sheets-Sheet 1

INVENTOR.
JOHN B. KRAELING
BY
William D. Carruthers
HIS ATTORNEY

May 17, 1966 J. B. KRAELING 3,251,590
FOLDED SPRINGS
Filed Dec. 26, 1963 7 Sheets-Sheet 2
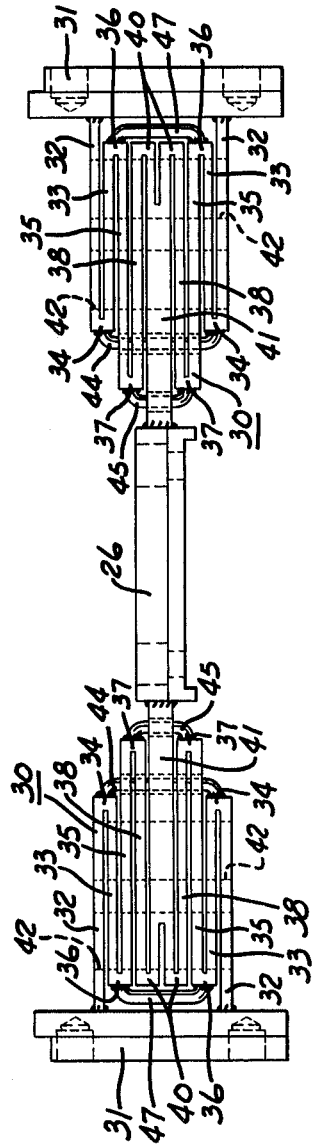
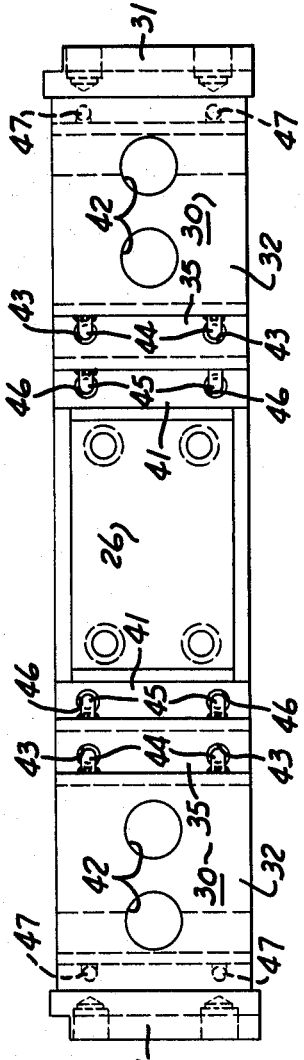
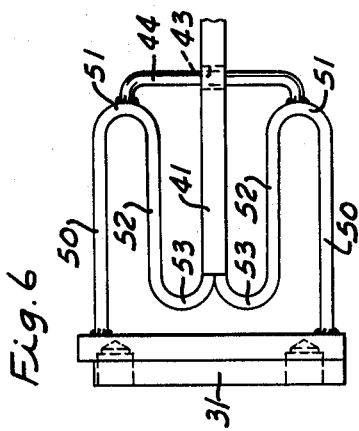
INVENTOR.
JOHN B. KRAELING
BY William D. Carothers
HIS ATTORNEY May 17, 1966  J. B. KRAELING  3,251,590
FOLDED SPRINGS Filed Dec. 26, 1963  7 Sheets-Sheet 3

INVENTOR.
JOHN B. KRAELING
BY
HIS ATTORNEY

May 17, 1966  J. B. KRAELING  3,251,590
FOLDED SPRINGS

Filed Dec. 26, 1963  7 Sheets-Sheet 4

INVENTOR.
JOHN B. KRAELING
BY
*William D. Carothers*
HIS ATTORNEY

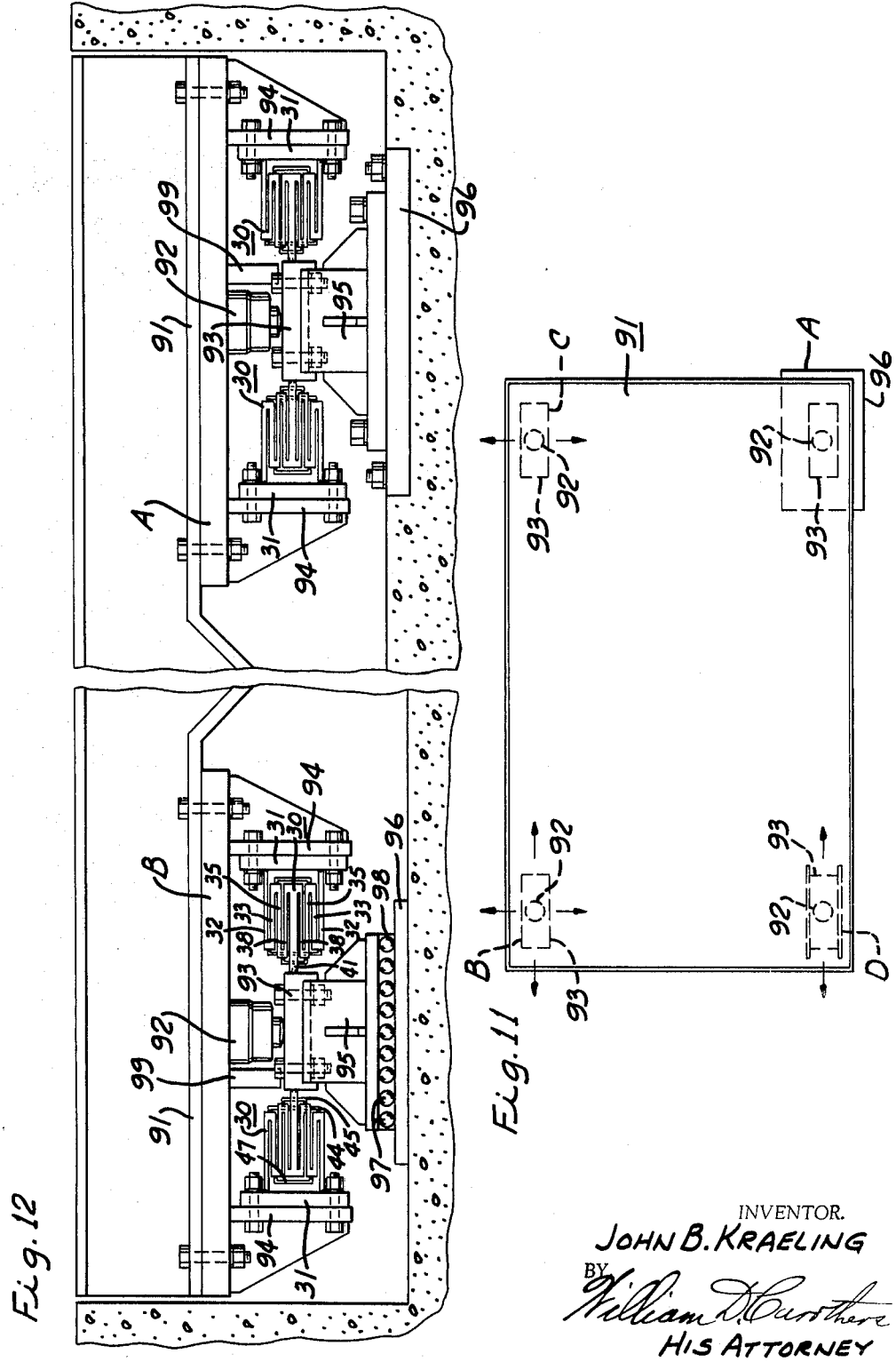

May 17, 1966  J. B. KRAELING  3,251,590
FOLDED SPRINGS

Filed Dec. 26, 1963  7 Sheets-Sheet 6

INVENTOR.
JOHN B. KRAELING
BY
HIS ATTORNEY

May 17, 1966 J. B. KRAELING 3,251,590
FOLDED SPRINGS

Filed Dec. 26, 1963 7 Sheets-Sheet 7

INVENTOR.
JOHN B. KRAELING
BY
HIS ATTORNEY

United States Patent Office 3,251,590
Patented May 17, 1966

3,251,590
FOLDED SPRINGS
John B. Kraeling, Meadville, Pa., assignor to Drafto Corporation, Cochranton, Pa., a corporation of Pennsylvania
Filed Dec. 26, 1963, Ser. No. 333,442
12 Claims. (Cl. 267—1)

This invention relates generally to flat springs for supporting a member for movement relative to a base and more particularly to a folded flat spring.

The provision of a spring that must have considerable stiffness yet the flexure provides little if no movement longitudinally of the spring gives rise to many difficult problems. Such a spring must have considerable length and it is in fact a beam, being defined as a cantilever beam, an end supported beam or a beam with two intermediate points of support in the manner of a suspension bridge. In beams and bridges the spans are required and the movement of the intermediate or free end can be measured or calculated for different load conditions.

In springs different problems arise. One cannot employ a long spring to obtain the right deflection under the proper load conditions. As an example one could not employ a long spring type beam to support a load in a travelling block that contains a weighing device such as load cell or strain gauge.

The present invention solves this problem by folding the spring into several sections wherein the flexing occurs in a direction normal to the plane of each of the folded sections. This shortens the length of the spring or flexing beam and still provides rigidity laterally and its stiffness is sufficient to prevent longitudinal movement as the folded sections merely open the gaps therebetween when flexed and thus substantially maintain the proper longitudinal dimensions when flexed which prevents the destruction of an instrument such as a weighing load cell or strain gauge. The folded sections open and close the gaps between the sections upon flexing the spring or upon vibratory movement. This action reduces the axial movement of the free portion of the spring which would be considerable if the spring was long and in a single plane.

The folded sections of the spring may be made by welding together consecutive adjacent ends of the folded series of sections with a space between the flat sections. The sections may be spaced from each other by gaps of various dimensions. These gaps may be uniform in width or even progressively greater within one gap or in consecutive gaps between the spring sections of a stack. These factors determine various modes of tuning the spring system.

Another important structural feature of this invention is the fact that these folded springs may be constructed of metal or plastic or plasticized members using fabric, whether metal fiber cloth, or plastic cloth such as fiberglas.

The spring may be made by forming the folded sections from a strip, welding or brazing the ends of small plate sections, cutting or sawing by the use of saw blades, saw discs, cutting arcs or laser light to form the slots in a solid block of metal or other material.

This spring has characteristics that are not known or realized in the art. The fact that when the sections flex they merely open wider one portion of the gaps between the sections provides a torsion type spring action at the juncture of adjacent spring sections in the stack. Such combined characteristics in a spring make its uses unlimited in many different fields such as vibratory systems for material handling devices, temperature and pressure systems where the action may be combined with the physical properties of bimetal or multi combinations of metal, plastics and ceramics.

Again the actual spring combinations are unlimited. The folded cantilever would be the simplest form for electromagnetic vibratory systems. The double cantilever or spaced supported beam with two spaced supports on a single spring is another combination. These supports could be at the opposite ends of two folded spring sections or end supported beam. These supports could be at spaced intermediate points with the movable member or part connected to the center and both ends or with two or three movable systems supported from one base as when one movable member would be supported by the free ends of the folded springs and the other by the connection between the spring systems. Here the base or reaction member of the system functions to respond to the multiple supported spring systems of the connected dual folded spring supported intermediate of each folded spring. These are obvious from the diagrammatic illustrations.

Another feature of a folded beam or spring comprising this invention is the provision of a means to limit the magnitude of displacement to tune the system. In a beam structure this is likened unto a suspension type bridge or truss. This is affected by using a smaller and more flexible member connecting the adjacent juncture ends of the folds of the spring or beam. These ties or bridging connections may add their flexibility to the system, their torsion action or their tension and compression characteristics to the spring system depending upon their shape, style and the manner in which they are connected or employed.

Other objects and advantages appear hereinafter in the following description and claims.

The accompanying drawings show for the purpose of exemplification without limiting this invention or the claims thereto, certain practical embodiments illustrating the principles of this invention; wherein—

FIG. 2 is a view in side elevation of a folded spring shown in FIG. 1.

FIG. 3 is a plan view of FIG. 2

FIG. 6 is an enlarged sectional view of an end section of the folded spring made by bending the spring plate.

FIG. 11 is a plan view of a platform weighing scale employing a spring device.

FIG. 12 is an enlarged view showing two of the suspension members at opposite ends.

Figure 1:
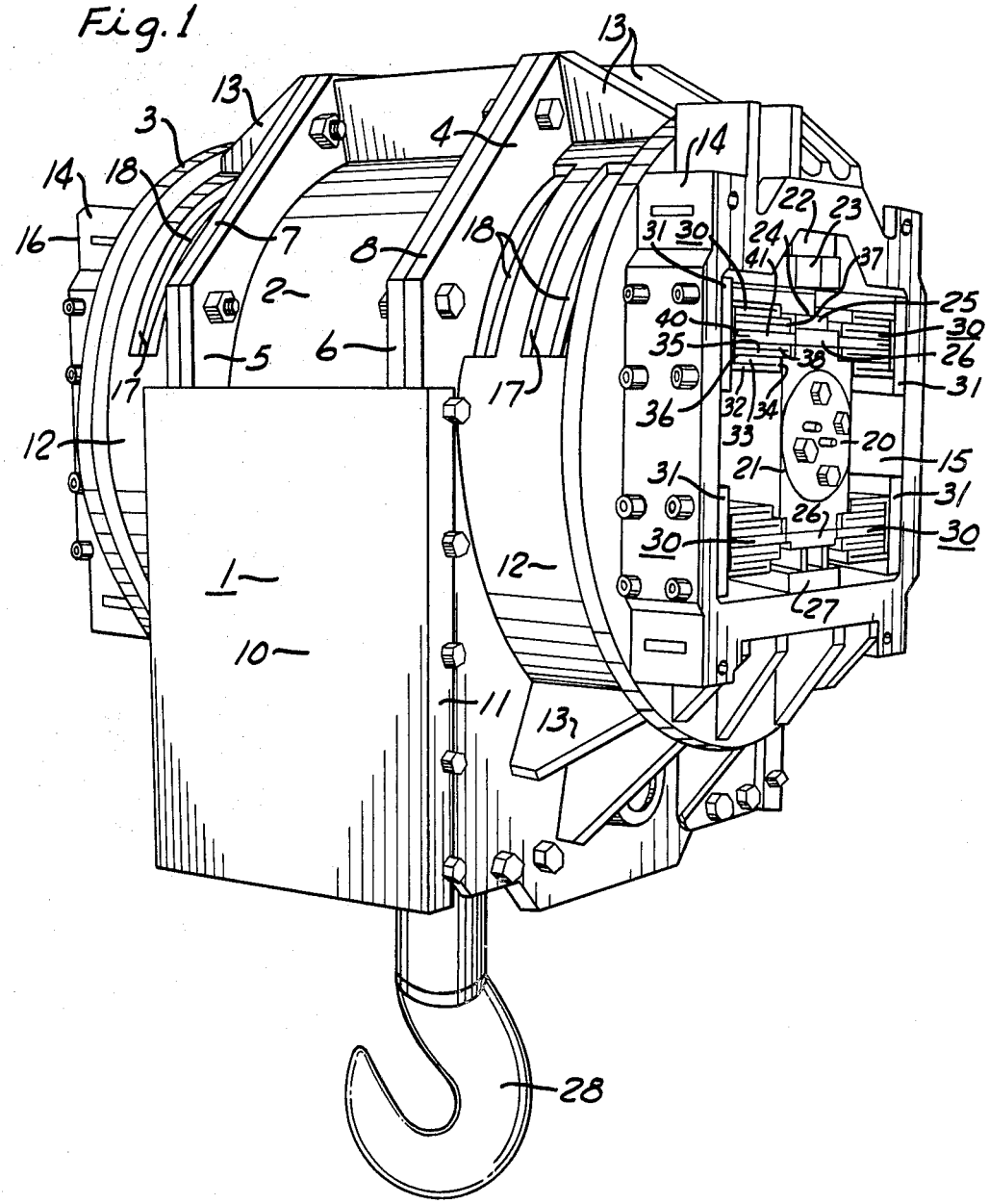
FIG. 1 is a perspective view of a sheave block supported by two sets of folded springs and two weigh cells.

Referring to FIG. 1 the folded springs comprising this invention are illustrated as being applied to a traveling block 1 which is made up of a central portion 2 and end portions 3 and 4. The central portion is provided with radial flanges on each side thereof as indicated at 5 and 6 and the end portions are provided with mating radial flanges 7 and 8. The radial flanges 5 and 7 are bolted together and the radial flanges 6 and 8 are bolted together so as to provide an assembled traveling block housing. On opposite sides the traveling block is provided with side members 10 which are provided with inwardly extending flanges 11 and embrace the outer faces of the flanges 7 and 8 and are bolted thereto.

The end portions 3 and 4 of the housing are provided with cylindrical bell members 12 which are secured as by welding and are provided with reinforcing angle brackets 13 at the top and bottom thereof. Each bell portion 12 is provided with an outwardly extending square frame 14 which is welded to the face of the bells 12 and provide a square chamber 15 which may be closed by a plate 16 illustrated as being secured to the end member 3, the end member 4 having its chamber 15 open to show the spring assembly in combination with its associated structure.

Arcuate openings 17 are provided in the upper portion of the cylindrical parts 12 for the passage of a cable that is weaved around the sheaves 18. The sheaves 18 are rotatably mounted on the pin member 20, the ends of which are secured in the block 21 that are disposed within the chambers 15 as illustrated. Suitable oiling and greasing facilities are provided at the end of the pin for lubricating the sheaves.

The upper end of the chamber 15 is provided with a block 22 to which is attached the strain gauge member 23 the ball point 24 of which rests on the pillow block 25 that is secured to the mounting member 26 of the spring system. Similar mounting means 26 are also provided at the bottom of the block and which is in spaced relation to the stop block 27 that rests in the bottom of the chamber 15.

Thus each end of the sheave pin 20 which is suspended by cables encircling the sheaves bears upwardly through the mounting means 26 and the pillow block 25 to the ball member 24 of the strain gauge 23 which pressure is assumed by the housing 1 for the purpose of supporting a load from a hook suspended from the pivoted hook shaft 28 at the bottom of the housing 1. The hook in this instance is provided with a means to rotate the same on its vertical axis relative to the housing 1. This is accomplished by providing a motor within the housing 1 to rotate the stem of the hook whether or not it is supporting a load. The hook likewise is preferably pivoted so that it not only swings on the axis 28 but also on an axis transverse thereto so as to provide a universal movement of the hook.

As shown in FIG. 1 there are four separate spring members 30 quadrangularly arranged and secured at their base ends to the inner wall surfaces of the chamber 15 and at the mounting means 26 to the sheave pin blocks 21.

Each spring 30 as shown is provided with a plurality of folded sections each mounted to flex normally to the planes of said sections. One spring section is required to be secured to the base as indicated at 31 and extend outwardly as indicated at 32. Since the spring shown in FIG. 1 is a double spring it is, of course, provided with two sections 32 that extend outwardly from the base. These first sections must be spaced from each other to allow for the plurality of folded sections that lie intermediate thereof. The second sections 33 of the folded spring are attached to and extend inwardly from the outer end of the first sections as indicated at 34 and extend inwardly but stop short of the base. The third section 35 is secured as indicated at 36 to the inner end of the second section 33 and the third sections 35 extend outwardly and are attached at their outer ends at 37 to the fourth section 38 which stop short of the base member 31 and are secured at 40 to the bar 41 that is secured to the mounting means 26. This specific spring structure is better illustrated in FIGS. 2 and 3 and as shown one side of the spring is a duplicate of the other on opposite sides of the mounting means 26 and on opposite sides of the mounting bar 41.

It is more clearly shown in FIG. 3 that the spring sections may be provided with stack holes 42 to change the tuning thereof such as for the purpose of making them more limber.

Selected of these spring sections are provided with openings as illustrated at 43 in FIG. 3. The openings 43 are passed through the spring sections 35 and 38 and the bar bar 41 and there are two sets of these for receiving the pins 44 which are secured to the joints 34 between the first and second spring sections 32 and 33. These pins actually limit the amount that the folded joint 34 can move relative to each other.

A similar set of pins 45 are employed to connect the joints 27 between the springs 38 and 35 and they pass through the openings 46 in the bar 41.

A similar pin 47 is provided adjacent the base 31 to connect the joint sections 36 of the two pairs of the second and third spring portions 33 and 35 as illustrated in FIG. 2 and this pin, not having to pass through any other spring sections, is free as illustrated in FIGS. 2 and 3.

As illustrated in FIGS. 2 and 3 the base members 31 are provided with suitable bolt means for securing the same to the inner face of the chamber 15.

The mounting means 26 is also provided with openings to receive mounting bolts for securing them to the sheave block 21. The sheave blocks 21 are notched at the corner so as to provide relief and avoid interference with the springs as illustrated in FIG. 1.

Figure 4:
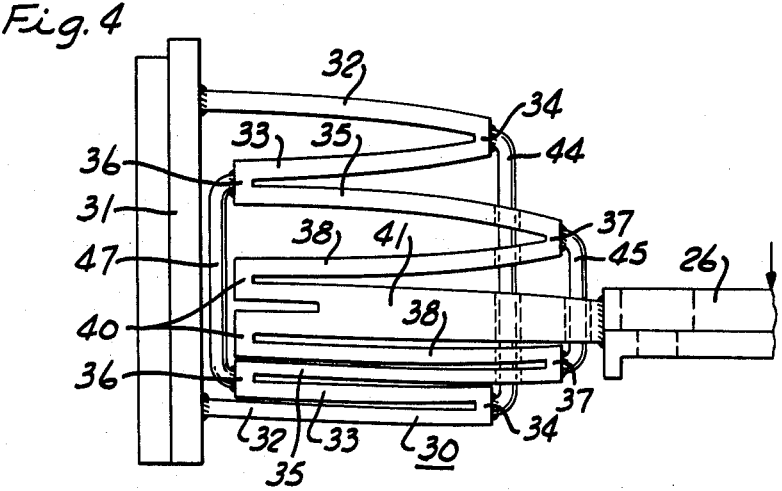
FIG. 4 is an exaggerated diagrammatic view of the expansion of one folded spring section.

Each of the pin members 44, 45 and 47 function to hold the respective joints to which they are attached from moving relative to each other. This is illustrated in an exaggerated view as shown in FIG. 4. Here the pins 44, 45 and 47 prevent relative movement between their connected ends. However, the spring sections 32 and 33 are shown to be opened relative to each other and the same is true as between the springs 33 and 35 and the springs 35 and 38, and 38 and 41 as shown in regard to the upper half of the spring as illustrated in FIG. 4. The lower structure of the spring section below the bar 41 acts in the opposite manner wherein the spring sections 32 and 33 are closer to each other which is also true of the space between the spring sections 33 and 35, and 35 and 38, and 38 and 41.

Thus for a full spring section such as illustrated on each side or in each quadrant as illustrated in FIGS. 1 and 2, for each increment opening of the upper set of spring sections, an equivalent closing of the relative spring section on the lower spring sections is made. Obviously, when the spring sections are vibrated these conditions reverse; that is, the upper set of spring sections will become closed and the space between the lower set of spring sections will become opened.

Figure 5:
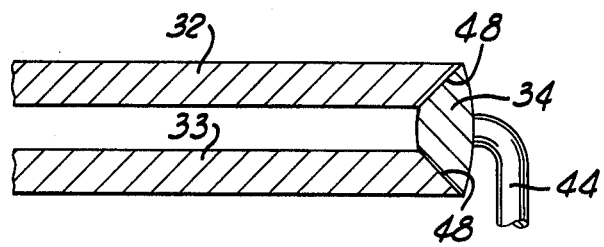
FIG. 5 is an enlarged sectional view of an end section of a folded spring made by welding the adjacent ends to a spacer block.

Referring specifically to FIG. 5 one joint of any one of the joints between the spring sections, such as between the sections 32 and 33 which are joined at 34, may be in practice a strip which strip could be a mere welding blob 34 that extends across the width of the springs. This blob is formed between the diagonnally formed faces 48 on the end of the spring sections 32 and 33 as illustrated in FIG. 5. Then, too, the blob or added metal member 34 supports the pin 44 as illustrated in FIG. 5.

There are many different ways of connecting the adjacent sections of these springs, one of which is illustrated in FIG. 6 wherein the base 31 has secured thereto the initial spring sections 50, the outer ends of which are bent as indicated at 51 to form the second section 52 that turns inwardly toward the base and is again bent as indicated at 53 and joined to the bar 41. The bar 41 is likewise provided with an opening 43 to receive the tie pins 44 in the same manner as that disclosed in FIGS. 2 and 3. A spring structure with bent ends of this character may be made to produce a rocking or arcuate movement and has applications in the electromagnetic vibratory field.

Figure 7:
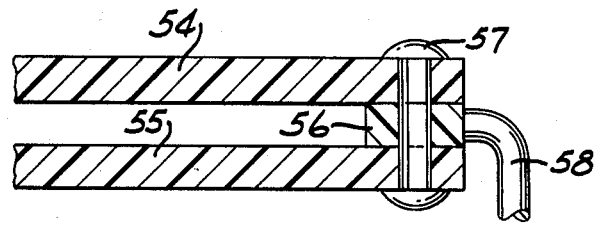
FIG. 7 is an enlarged sectional view of an end section of a folded spring made of a laminated plastic material.

In the structure of FIG. 7 either the springs or the blocks that support them may be made of plastic material and the spring member 54 is secured to the spring member 55 through the block 56 that is riveted by the rivets 57. The pin 58 may be an integral structure of the block 56. However, if the pin and the block are of a metal that can be welded or brazed, the pin 58 may be welded or brazed or otherwise secured to the block 56.

Figure 8:
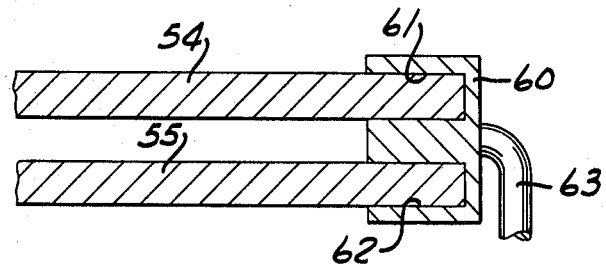
FIG. 8 is an enlarged sectional view of an end section of a folded spring made by securing the adjacent ends in the socket member.

As illustrated in FIG. 8 the springs 54 and 55 may be of any suitable material such as metal or plastic and they may be secured by means of a socket member 60 which is provided with spaced pockets 61 and 62 for receiving the ends of the springs 54 and 55. Here again the socket member 60 has secured thereto the pin member 63 for holding the joint relative to a similar connection in the balanced spring system as previously described with reference to FIG. 2.

Figure 9:
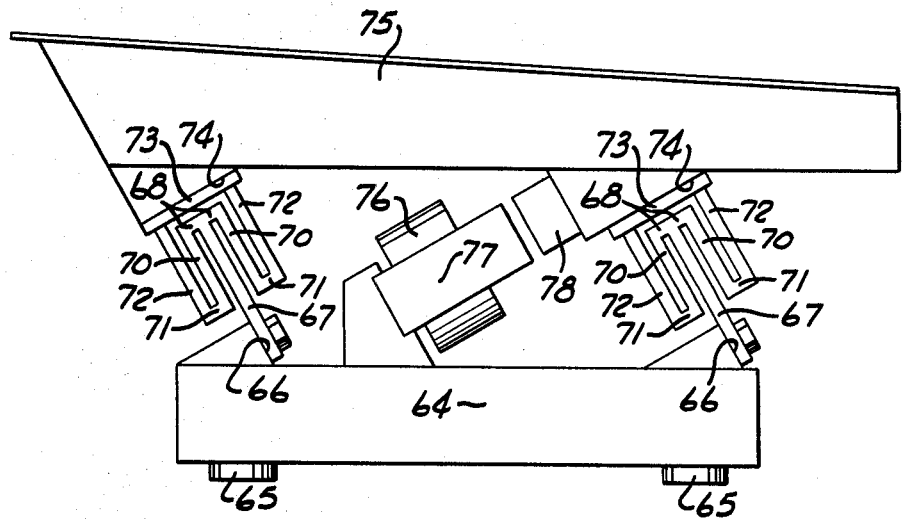
FIG. 9 is a view in side elevation of a folded spring of the cantilever type employed to suspend a vibratory feeder.

Referring now to FIG. 9 it will be seen that a spring section such as illustrated is applied to a vibratory trough feeder wherein the base 64 of the trough feeder is mounted on the resilient isolator members 65 and is provided with the spaced seats 66 for receiving the intermediate bar member 67 of the front and back springs that are formed in the manner similar to that described in regard to FIGS. 1 and 2 but with a lesser number of spring sections. Here the bar or intermediate member 67 which may also be a spring has secured at its outer ends as indicated at 68 the spaced spring sections 70, the opposite ends of which are provided with the fastening means 71 for securing the ends of the spring sections 72 thereto, the other ends of the spring sections 72 being secured to the common member 73 which in turn is mounted on the seat 74 on the under side of the trough 75. These spaced spring members are, of course, tuned to within a few cycles of the frequency of the current impulses supplied to the electromagnet 76 mounted on the core 77 supported by the base and which magnetic impulses attract the armature 78 which is likewise mounted to the under side of the conveyor trough 75 and the movement of the trough and the center of gravity of the system is preferably on or near the central axis which is preferably synonymous or adjacent to the reciprocating axis to the motor formed by the core 77 and the armature 78. Here the springs are not shown to be connected by the pins as previously described. However, one may connect the free ends of the selected spring sections by an adjustable means to vary their loading and thus the tuning of the system.

Figure 10:
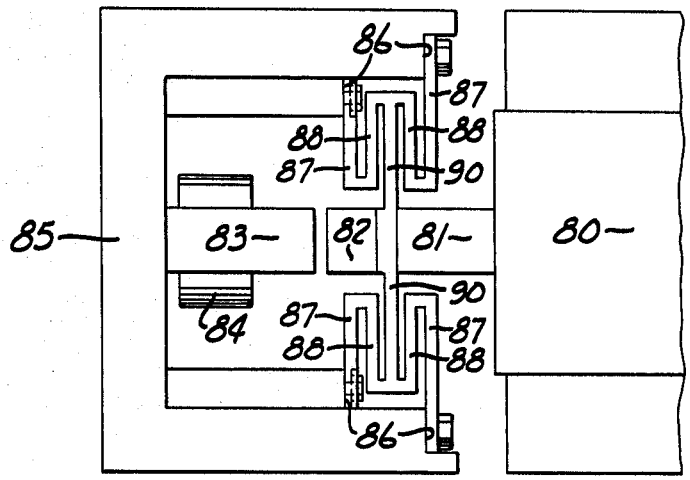
FIG. 10 is a plan view of an electromagnetic motor for a vibratory screening or conveying device employing a dual cantilever spring support.

A similar spring arrangement is made in a conveyor assembly as illustrated in FIG. 10 wherein the frame 80 for supporting the trough has a rearward extension 81 which supports the armature 82 in operative spaced relation with the core 83 of the electromagnet having the coil member 84 and mounted on the base 85 which may be suspended. The base is U-shaped and is provided with suitable seats 86 for receiving the outer spring sections 87 and the inner spring sections 88 are connected to the outer spring sections 87 at one end and to the transverse bar member 90 at their other end which is secured to the mounting member 81 with the armature 82 forming a part of the trough. This structure merely illustrates another form of reciprocatory electromagnetic vibratory conveyor that may employ the same type of springs. In FIG. 9 the double spring is employed as a cantilever; whereas in FIG. 10 the opposite ends of the multiple system of the springs are connected to the base as opposed to the spring section rather than as a cantilever as indicated at FIG. 9.

When this spring system is applied to a weigh scale platform as illustrated in FIG. 11 the platform 91 is suspended through the load cells 92, one at each corner, and which load cells have their spherical buttons resting on a block 93 each of which is connected to its respective spring system. Each spring system is similar to that shown in FIG. 2 wherein the base members 31 are secured to the brackets 94 that are suspended from the under side of the scale platform 91. Each spring system has the spaced outer spring sections 32 connected consecutively with the spring sections 33 and 35 and 38, the inner ends of which are connected to the bar 41 and the bars 41 are in turn connected to the block 93. These spring sections are also provided with the tie pins 44, 45 and 47. Thus the spring section is identical with that illustrated in FIG. 2. However, the support for the blocks 93 differ in the following respects.

As shown at the right in FIG. 12 the block 93 is secured to a stand 95 that is solidly bolted to the foundation base 96. This is illustrated at the lower right-hand corner support member in FIG. 11 marked as A. Each of the other three load cells 92 are mounted in the same manner in so far as the platform is concerned. However, their respective blocks 93 are mounted on their respective stand 95 so as to have movement relative to the foundation 96. As illustrated in the left-hand portion of FIG. 12 the under side of the stand 95 is supported on the ball bearings 97 which are supported between the guides 98 so as to permit this corner of the scale platform to move in accordance with the arrows illustrated in FIG. 11 at the upper left-hand corner support member marked as B.

The corner suspension members shown at the upper right-hand and the lower left-hand corner in FIG. 11 (marked C and D respectively) are identical to that member B shown to the left in FIG. 12 except that in place of ball bearings, roller bearings are employed which permit platform to have the movement in opposite directions as illustrated by the arrows at C and D in FIG. 11. Thus roller bearings are employed at support members C and D in FIG. 11 to provide unidirectional transverse movement as illustrated by the arrows. Member A is secured for no movement; whereas member B is secured for multidirectional movement through use of bearings 97. Thus the scale platform 91 is permitted to expand and contract and this expansion and contraction is intermediate to the blocks 93 and the stands 95 through the spring system without putting any undue strain or stress movement on the spherical contact points of the load cells relative to the blocks 93; yet, the scale may expand and contract with temperature a considerable degree without fear of causing any relative movement between the block 93 and its load cell 92 which would destroy the latter.

Stops 99 may be provided to limit the downward movement subjected to load cells. The air gap between the stops 99 and the blocks 93, if, of course, determined by the capacity of the load cell as it is undesirable to overload these load cells and it is best to take up the pressure of such overload by a stop such as indicated at 99.

Figure 14:
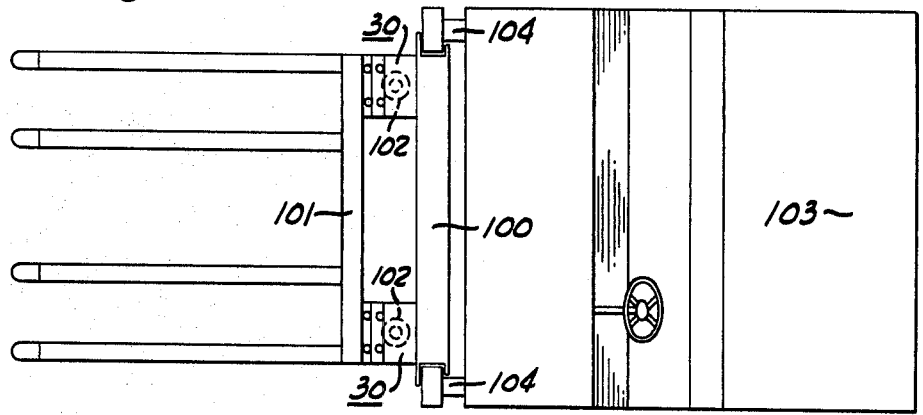
FIG. 14 is a plan view of FIG. 13.
Figure 13:
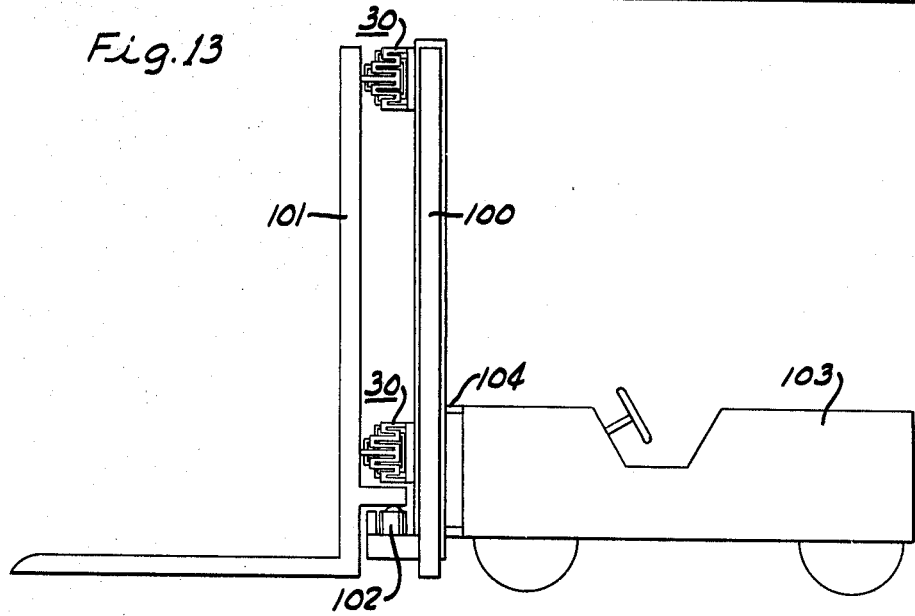
FIG. 13 is a view showing a spring suspension fork lift for weighing the loads handled thereby.

Referring now to FIGS. 13 and 14 it will be noted that a spring system such as illustrated in FIGS. 1, 2 and 12 may be employed on the elevating frame 100 for suspending the fork lift 101. The elevating frame 100 is also provided with a load cell 102 so that the load is measured at all times regardless of the elevation of the fork lift 101. This fork lift is mounted on the front of a vehicle such as illustrated at 103 which has suitable controls for not only raising the elevating frame 100 to any degree on the support frame 104 but to transport the same. Here again the folded spring sections 30 such as illustrated in FIGS. 2 and 12 may be employed to prevent relative movement between the lifting fork 101 and the elevating frame and thus permit the use of a load cell on such a structure. Yet the spring 30 will provide a relative movement along an axis normal to the planes of the spring's leaf sections.

Figure 15:
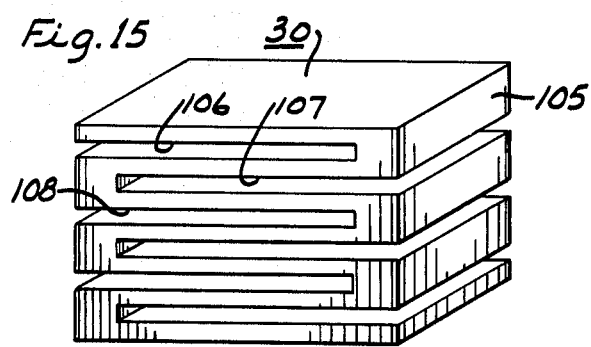
FIG. 15 is a perspective view of a spring comprising this invention cut from a solid block.

Referring now to FIG. 15 it will be noted that the spring 30 is formed from a solid block of metal such as illustrated at 105. This may be done by merely sawing on alternate ends of the block such as illustrated in forming the kerfs 106, 107 and 108 from opposite sides of the blocks. These saw cuts, of course, can be made by an ordinary tooth saw or by means of cutting torches or concentrated light beams developed for such purposes. Multiple springs may be made very inexpensively from a block of metal.

Figure 16:
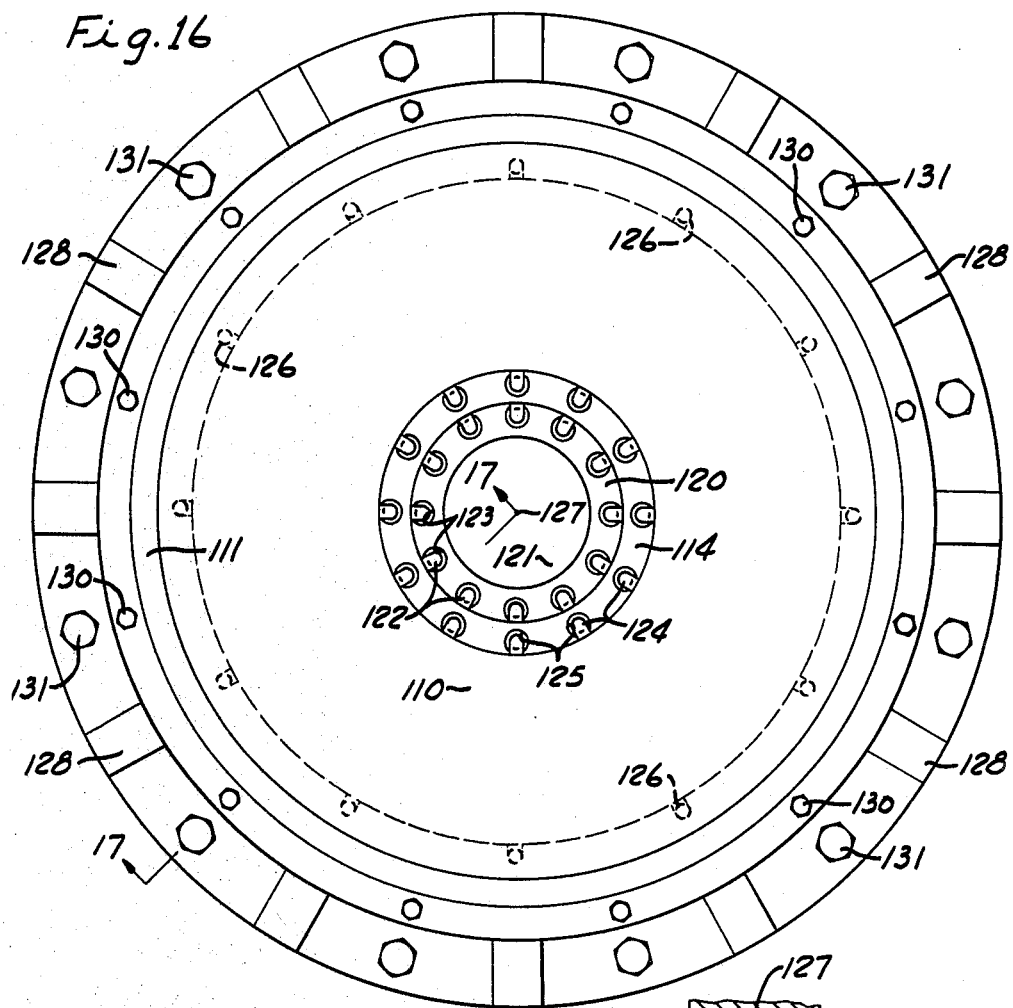
FIG. 16 is a plan view of a circular folded spring.
Figure 17:
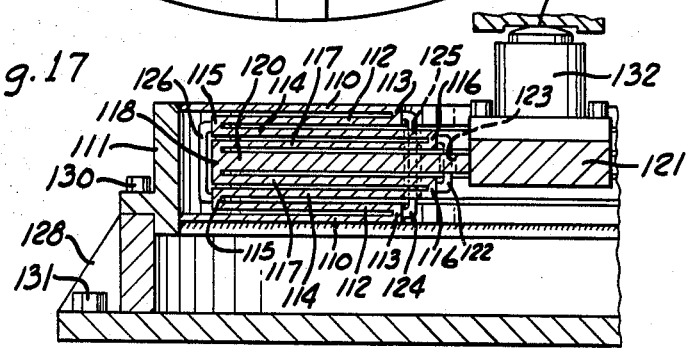
FIG. 17 is a vertical section taken along the line 17—17 of FIG. 16.

FIGS. 16 and 17 show the utilization of the spring comprising this invention in a circular pattern to form a circular folded spring arrangement. The folded spring construction is similar to that of the previously described folded spring except that in the annular folded spring, the folded spring sections are in the form of rings.

The first annular or ring spring sections 110 are secured to the annular base member 111. These first two sections 110 are spaced from each other to allow for the plurality of folded sections that lie intermediate thereof. The inner perimetral edge of the second ring section 112 are attached to the inner perimetral end of the first ring sections as indicated at 113. However, the outer perimeter of these ring sections stop short of the base member 111. The third ring sections 114 are secured at their outer perimetral end as indicated at 115 to the outer perimetral end of the second ring sections 112. The third ring sections 114 are attached at the inner perimetral edge at 116 to the fourth ring sections 117 which stop short of the base member 111 and are secured at 118 to the annular plate 120 that is secured to the annular mounting means 121.

Pins 122 are employed to connect the inner perimetral edges 116 between the springs 114 and 117 and they pass through the openings 123 in the annular plate 120.

A similar set of pins 124 pass through the openings 125 in the spring sections 114 and 117 and annular plate 120 and are secured to the perimetral edges 113 of the spring sections 110 and 112.

Another set of pins 126 are provided adjacent the base 111 to connect the perimetral edges at 115 of the second and third spring sections 112 and 114.

Thus the construction of the circular folded spring is the same as the folded spring construction previously described except that in the case of circular folded springs the sections of the spring are in the form of rings, forming a continuous folded spring. The advantage of this structure is that the concentrated weight at the center 127 of the spring is equally distributed in all directions from the center 127 to the base 111.

The annular base member 111 is secured to the annular anchor member 128 by means of bolts 130. The anchor member 128 may be secured to a suitable foundation by means of bolts 131.

The circular folded spring has a wide field of application. One application, although not limited thereto, is the use of a load cell 132 to determine the weight of a load centered at 127. Due to uniform distribution of forces in this particular spring construction, the circular folded spring has excellent application in places where a load must be resiliently supported or suspended.

I claim:

1. A spring of folded sections which consist of a base and a movable member, a spring member having a series of sections subjacent relative to each other, the first and last sections of said series defining a pair and secured at one end to said base in spaced parallel relation to each other to freely support the intermediate sections of the series positioned therebetween, said first pair of sections extending in the same direction from said base, the next inner or second pair of sections of the series connected at one of their ends to the other ends of said first pair of sections and their other ends are connected only to said member movable relative to said base.

2. A spring of folded sections which consists of a base and a movable member, a spring member having a plurality of sections forming a series with adjacent sections subjacent relative to each other, the first and the last section of the series connected at its outer end to said base in spaced relation to each other, the next adjacent sections of the series connected at one of their ends only to the inner ends of their adjacent first sections and at their opposite ends only to the adjacent ends of their next succeeding sections of the series, the last ends of the last sections of the series connected relative to each other, and connecting means on said last ends of said last sections of the series attached to said member which moves relative to said base.

3. A spring of folded sections which consists of a base and a movable member, a spring member having a plurality of sections forming a series with adjacent sections subjacent relative to each other, the first and the last section of the series connected at its outer end to said base in spaced relation to each other, the next adjacent sections of the series connected at one of their ends only to the inner ends of their adjacent first sections and at their opposite ends only to the adjacent ends of their next succeeding sections of the series, the last ends of the last sections of the series connected relative to each other, and connecting means on said last ends of said last sections attached to said member movable relative to said base, and bridge means connecting the movable ends of each of said first and said last section in subjacent parallel planes.

4. A spring of folded sections which consists of a base and a movable member, a spring member having a plurality of sections forming a series with adjacent sections subjacent relative to each other, the first and the last section of the series connected at its outer end to said base in spaced relation to each other, the next adjacent sections of the series connected at one of their ends only to the inner ends of their adjacent first sections and at their opposite ends only to the adjacent ends of their next succeeding sections of the series, the last ends of the last sections of the series connected relative to each other, and connecting means on said last ends of said last sections attached to said member movable relative to said base, and bridge means connecting the corresponding intermediate connected ends on opposite sides of the last sections of the series.

5. A spring of folded sections which consists of a base, a movable member, a plurality of spring members supporting said movable member therebetween, each spring member including a series of sections subjacent relative to each other forming a stack, the first and last sections of each series in the stack forming a pair and secured at one end to said base in spaced parallel relation to each other with the intermediate pairs of sections of the series positioned therebetween, the next intermediate or second pair of sections of each series connected at one end to the other end of said first pair of the series and their other ends are connected to the adjacent ends of the third pair of sections, each additional pair of sections of each series connected alternately at their opposite ends to the ends of the next adjacent pair of the series to progressively complete the series as to the pairs of sections in each stack, a mounting means connected to the remaining ends of the last pair of sections in the progressive series of each stack for attachment to said member that is movable relative to said base.

6. The folded spring of claim 5 which includes interconnecting coupling pins secured between the ends of adjacent pairs of sections in each series to uniformly distribute the degree of displacement of movement between the connected pairs of sections by said coupling pins.

7. The folded spring of claim 5 which includes a second and duplicate folded spring and a connecting member between said mounting means of each folded spring to carry said member that is movable relative to said base.

8. The foldled spring of claim 5 which includes interconnecting coupling pins secured between the ends of adjacent pairs of sections in each series to uniformly distribute the degree of displacement of movement between the connected pairs of sections in each stack by said coupling pins.

9. A spring of folded sections which consists of a base and a member, a block having a series of gaps, adjacent gaps extending from alternate opposite ends of said block to form a series of folded spring sections, the first and last sections of said series defining a pair, an attaching means at the same end of said pair securing said spring to said base, a second pair of sections having their outer ends connected to the outer ends of said first pair and their opposite inner ends connected to the adjacent ends of the third pair of sections with the gap therebetween, each additional pair of sections of the series are connected alternately at their opposite ends to the next adjacent pair of sections of the series of sections to progressively complete the series of pairs of sections, and connecting means on the remaining ends of the last pair of sections in the progressive series attached to said member movable relative to the attaching means of the first pair of the series.

10. A spring of annular folded sections which consists of an annular base, an annular spring member having a series of annular washer-like sections subjacent relative to each other with their annular perimeters spaced annular sections of said series defining a pair and secured at one end to the inner surface of said annular base in spaced parallel relation to each other with the intermediate annular sections of the series positioned therebetween said first pair of annular sections extending radially inward from said base, the next inner or second pair of annular sections of the series connected to the inner circular perimeter of the first pair of annular sections and their outer circular perimeters connected to the outer circular perimeters of the third pair of annular sections, each additional intermediate pair of annular sections of the series connected alternately at their opposite inner and outer perimeters to the next adjacent pair of annular sections of the series of annular sections to progressively complete the connection of the series of pairs of annular sections making up the spring, and circular mounting means on the remaining inner perimeters of the last pair of annular sections in the progressive series for attachment to a member movable relative to said base.

11. The spring of claim 9 which includes interconnecting coupling pins secured between the adjacent opposite ends of secured pairs of sections in the series to uniformly distribute the degree of displacement of movement between the connected pairs of sections by said coupling pins.

12. The spring of claim 10 which includes a plurality of interconnecting coupling pins secured between the adjacent inner and the adjacent outer circular perimeters of pairs of washer-like sections in the series to uniformly distribute the degree of displacement of movement between the connected pairs of washer-like sections by said coupling pins.

References Cited by the Examiner

UNITED STATES PATENTS

| 2,008,765 | 7/1935 | McCullough | 267—1 X |
| 2,063,216 | 12/1936 | Zaparka | 267—30 |
| 2,430,695 | 11/1947 | Weisbecker | 267—1 X |
| 2,457,073 | 12/1948 | Stearns | 267—1 X |
| 3,025,031 | 3/1962 | Kerley | 267—1 X |
| 3,162,723 | 12/1964 | McCurtain | 174—138 |
| 3,183,731 | 5/1965 | Dolza | 64—15 X |

FOREIGN PATENTS

| 766,618 | 8/1951 | Germany. |

OTHER REFERENCES

Papello et al., German printed application, No. 1,034,880, published 7/24/58.

Hagemeier et al., German printed application, No. 1,109,463, published 6/22/61.

ARTHUR L. LA POINT, *Primary Examiner.*

W. B. WILBER, *Assistant Examiner.*